Patented Apr. 4, 1944

2,345,577

UNITED STATES PATENT OFFICE 2,345,577

PROCESS FOR REFINING FATTY MATERIALS

Loran O. Buxton, Belleville, N. J., assignor to National Oil Products Company, Harrison, N. J., a corporation of New Jersey No Drawing. Application January 21, 1941, Serial No. 375,255

12 Claims. (Cl. 260—398.5)

This invention relates to the refining of vitamin A or D containing materials, more particularly to the refining of fish liver oils and concentrates prepared therefrom.

As is well known in the art, fatty materials, particularly vitamin A or D containing materials such as, for example, fish liver oils and concentrates prepared therefrom, have a wide variety of uses in the nutritional fields. However, many of these products, especially those of a fish origin, have characteristic odors and tastes which render them somewhat unpalatable to the consumer. Another undesirable property of these materials is that they tend to be somewhat unstable when exposed to oxidizing influences. These undesirable properties of fatty materials have in some cases tended to limit their field of usefulness, so that there is a demand for a simple and effective method for producing such materials free of these objectionable features.

It has been recognized for some time that many vegetable meals contain valuable antioxidants. It has been further recognized that these meals possess the property of being able to remove some of the undesirable odor and taste from fatty materials either by adsorption of the objectionable odor and taste-forming constituents, or by transference of the characteristic odor and taste of the meal to the fatty material. In order to utilize these properties, it has been proposed to extract some of the antioxidants from vegetable meals by mixing a fatty material with the meal and agitating the mixture for a suitable period of time; this proposal also purported to improve the odor and taste of the fatty material by contact thereof with the meal. This process, however, has not been particularly successful for two reasons. In the first place, many of the antioxidants contained in the meal are not extracted therefrom merely upon contact with the fatty material, so that the full value of these antioxidants is not realized. In the second place, an appreciable portion of the fatty material being refined is adsorbed by the meal and may be recovered therefrom only with difficulty; thus there is usually much loss of the fatty material incidental to this process.

It has also been proposed to subject vegetable meals to solvent extraction in order to extract therefrom the flavor constituents of the meal and materials of an antioxidant nature, and then to add this extract to a fatty material in order to improve its odor, taste and stability. This proposal likewise possesses serious disadvantages. In the first place, since the fatty material is not contacted with the meal, the valuable adsorbent effect of the meal on the objectionable odor and taste-forming constituents of the fatty material is not utilized. In the second place, the solvent extraction generally removes from the meal substantial quantities of substances not compatible with the fatty material to be refined; as a result, when such extracts are added to fatty materials, separation of certain of the ingredients of the extracts usually takes place.

From the above discussion it will be evident that the proposals thus far advanced have not succeeded in utilizing vegetable meals to the utmost advantage for purposes of refining fatty materials. Much experimentation has been done in this field, but as yet a satisfactory commercial process has not been developed.

It is an object of this invention to provide an efficient method of stabilizing and refining fatty materials, particularly vitamin A or D containing materials.

It is a more specific object of this invention to provide a process for stabilizing and refining fish liver oils and fish liver oil concentrates utilizing vegetable meals.

As a result of extensive experimentation, I have discovered that the beneficial properties of vegetable meals may be most efficiently utilized for the stabilization and refining of fatty materials, particularly vitamin A or D containing materials, by contacting such materials with the meal in the presence of a solvent for the fatty material. The direct contact of the fat material with the meal permits the meal to adsorb and thereby remove undesirable taste and odor-forming constituents of the material being refined. Furthermore, the combined action of the fatty material and solvent therefor permits the recovery from the meal of all the desirable antioxidant and flavor constituents compatible with said material without introducing substances of an incompatible nature into the refined product. Thus my invention provides a method for a more effective utilization of the valuable constituents of vegetable meals than has been heretofore achieved. The preferred embodiment of my invention involves contacting a vitamin A or D containing material with a vegetable meal in the presence of a solvent for said material containing a relatively small amount of a lower aliphatic monocarboxylic acid, since I have found that the presence of the acid tends to release any antioxidants entrapped in the meal and thus make them available to the vitamin material.

whereby vitamin products having increased stability and improved taste and odor are obtained. My process overcomes all the difficulties incidental to processes heretofore advanced for the utilization of meals for stabilizing and refining of fatty materials; therefore, the products produced by my process will meet the demands of the industry in a satisfactory manner.

The fatty materials which may be treated in accordance with this invention may be any such material from which it is desired to remove objectionable odor or taste, or to which it is desired to impart increased stability. The invention is particularly applicable to the treatment of vitamin A or D containing materials containing one or both of these vitamins in the alcohol or ester form. Thus, for example, fish liver oils such as cod liver oil, shark liver oil, sword fish liver oil, ling cod liver oil, halibut liver oil and the like may all be treated, as well as vitamin concentrates prepared from such fish liver oils by saponification of the oils and extraction of the unsaponifiable fraction therefrom. Furthermore, highly potent products prepared by high vacuum distillation of the fish liver oils may be treated with advantage; other highly potent products prepared by solvent extraction of the fish liver oils or by similar methods designed to produce a fraction having the vitamin potency concentrated therein may also be treated. However, other fatty materials capable of being improved by treatment with vegetable meals may also be processed; thus, for example, this invention may be applied to the refining of cottonseed oil, soybean oil, peanut oil, sesame oil, lard and similar products.

Any vegetable meal may be employed in the practice of this invention, particularly those rich in natural antioxidants; thus, for example, cottonseed meal, soybean meal, sesame meal, corn meal, corn germ meal, wheat germ meal, alfalfa leaf meal, peanut meal, rice bran, rye, barley, and other vegetable meals known to the art may be employed. These meals may be prepared by either cold pressing or expelling oil from the vegetable and grinding, or by extracting the oil from the vegetable with a solvent and grinding. Preferably, however, a meal having a low oil content prepared by cold pressing or expelling oil from the vegetable is employed. If desired, an adsorbent, such as activated carbon or an activated earth, may be added to the meal in order to assist in the removal of the objectionable odor, taste and color-forming constituents. It is advantageous to substantially completely deaerate the meal before it is employed in the practice of my invention in order to minimize oxidation of the vitamins during the refining process; this deaeration may be advantageously carried out by agitating the meal with the solvent to be employed until the entrapped air has been driven from the meal.

The solvent employed in the practice of this invention should be one in which the fatty material to be refined is readily soluble. Thus if a fish liver oil or concentrate prepared therefrom is being treated, a hydrocarbon or halogenated hydrocarbon solvent such as hexane, heptane, octane, ethylene dichloride, trichlorethylene, carbon tetrachloride, cyclohexane, methyl cyclohexane or benzene may be employed as the solvent, as well as solvents such as acetone, diacetone alcohol and the like. The solvent employed preferably contains a relatively small amount of a lower aliphatic monocarboxylic acid, since I have found that the presence of such acids in the solvent releases natural antioxidants present in the meal and therefore permits the transfer of these antioxidants to the material being refined with the consequent increase in stability of the final product. Acetic acid is preferably employed for this purpose because of its ready availability and effectiveness; however, other lower aliphatic monocarboxylic acids such as propionic acid, butyric acid, or lactic acid may also be employed. The amount of acid incorporated in the solvent may vary somewhat with the particular acid employed, but generally an amount varying between about 1% and about 20% is suitable.

The process of my invention may be carried out in a variety of ways. The fatty material, meal and solvent may be mixed and the mixture then agitated thoroughly. If desired, the fatty material may be dissolved in the solvent therefor and the meal then added to the solution. Alternatively the meal may be first agitated with the solvent before the addition of the fatty material, in order that the antioxidants contained in the meal may be extracted by the solvent and thus made more readily available to the fatty material subsequently added. The particular amounts of the ingredients incorporated in the mixture may vary widely, but generally it is more suitable to employ between about 5 and about 120 or more parts of a meal per 100 parts of fatty material; the amount of solvent employed should be at least equivalent to, and preferably somewhat in excess of, the amount of material being refined. The process may be carried out at room temperature, or elevated temperatures may be employed. After the mixture has been thoroughly agitated for between about ½ and about 3 hours, the meal may be removed by filtration and the refined material recovered by evaporation of the solvent.

In accordance with the preferred embodiment of my invention, a vitamin A or D containing material is refined by contact with a vegetable meal in the presence of a solvent containing between about 1% and about 20% of a lower aliphatic monocarboxylic acid. This embodiment is preferably carried out by mixing such a solvent mixture with the meal, refluxing the mass in an inert atmosphere for a short while in order to release the antioxidants present in the meal, adding the vitamin-containing material to be refined and then agitating the mixture for the desired length of time in an inert atmosphere, preferably under reflux conditions or at least at somewhat elevated temperatures. After cooling, the meal may be removed by filtration and the vitamin material recovered by evaporation of the solvent. Products produced by this procedure have proved to be superior in many respects to vitamin A or D containing materials at present available. In the first place, their stability is greatly improved; furthermore, the antioxidants transferred thereto from the meal are, by reason of the cooperative solvent action of the vitamin material and solvent used, completely compatible with the vitamin material. Secondly, these products all have pleasant odors and tastes and hence are readily and easily ingested. These advantages impart to my products distinct value in the fat-soluble vitamin field.

The following examples are illustrative of my invention; amounts are given in parts by weight.

*Example I*

100 parts of soybean meal were mixed with 300 parts of acetone containing 5% acetic acid and the mixture deaerated by bubbling nitrogen gas therethrough. 100 parts of shark liver oil containing 97,400 A units per gram and having an objectionable odor and taste were then added to the mixture and the mass refluxed for three hours. At the end of this time, the mass was permitted to cool, filtered to remove the meal, and the solvent evaporated. The resulting product contained about 93,000 A units per gram and had a pleasant taste and odor. This product was tested for its stability by maintaining it at a temperature of about 34.5° C. in the presence of air, with the following results:

| Sample | Vitamin A destroyed after— | | | |
|---|---|---|---|---|
| | 6 days | 14 days | 20 days | 27 days |
| Product of Example I | Percent 5.37 | Percent 17.8 | Percent 28.6 | Percent 41.5 |
| Original oil | 9.86 | 42.3 | 72.1 | |

*Example II*

The shark liver oil containing 97,400 A units per gram and having an objectionable odor and taste was treated by the same process as described in Example I except that corn germ meal was employed in place of the soybean meal. The resulting product was an oil containing 98,000 A units per gram and having a pleasant taste and odor. Stability tests conducted on this product as described in Example I gave the following results:

| | Vitamin A destroyed after— | | | |
|---|---|---|---|---|
| | 6 days | 14 days | 20 days | 27 days |
| Product of Example II | Percent 3.68 | Percent 19.0 | Percent 30.8 | Percent 43.9 |

*Example III*

The shark liver oil containing 97,400 A units per gram and having an objectionable odor and taste was refined by the same process as described in Example I except that wheat germ meal was employed in the place of soybean meal. The resulting product contained 97,600 A units per gram and had a pleasant taste and odor. Stability tests conducted on this product as described in Example I gave the following results:

| | Vitamin A destroyed after— | | |
|---|---|---|---|
| | 6 days | 14 days | 20 days |
| Product of Example III | Per cent 9.24 | Per cent 24.7 | Per cent 43.5 |

*Example IV*

25 parts of sword fish liver oil containing 172,000 A units per gram and having an objectionable color, odor and taste were mixed with 225 parts of ethylene dichloride, 5 parts of cottonseed meal and 2.5 parts of activated carbon. The mixture was then agitated for 1 hour, filtered and the solvent evaporated. The resulting product contained about 170,000 A units per gram and had a pleasant odor and taste and a light color.

It will be noted from the above examples that the products tested for their stability were much more stable than the original oil; furthermore, all these products had improved tastes and odors as compared to the original oil. All the products of the above examples were clear oils, indicating that the antioxidants contained therein were completely compatible therewith.

From the above description it will be evident that my invention provides a process for the production of refined and stabilized fatty materials which is simpler and more effective than processes heretofore devised. Hence my process will undoubtedly be of great interest to those engaged in the production of vitamin-containing materials.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. A process for refining a fatty material, which comprises contacting said material with a vegetable meal in the presence of a solvent for said material, said solvent containing a relatively small amount of a lower aliphatic monocarboxylic acid.

2. A process for refining a fatty material of marine origin containing a member of the group consisting of vitamins A and D, which comprises contacting said material with a vegetable meal in the presence of a solvent for said material, said solvent containing a relatively small amount of a lower aliphatic monocarboxylic acid.

3. A process for refining a fatty material of marine origin containing a member of the group consisting of vitamins A and D, which comprises contacting said material with a vegetable meal in the presence of a solvent for said material, said solvent containing between about 1% and about 10% of a lower aliphatic monocarboxylic acid.

4. A process for refining fish liver oils, which comprises contacting the oil with a vegetable meal in the presence of a solvent for said oil, said solvent containing between about 1% and about 10% of a lower aliphatic monocarboxylic acid.

5. A process for refining fish liver oils, which comprises contacting the oil with soybean meal in the presence of a solvent for said oil, said solvent containing between about 1% and about 10% of a lower aliphatic monocarboxylic acid.

6. A process for refining fish liver oils, which comprises contacting the oil with wheat germ meal in the presence of a solvent for said oil, said solvent containing between about 1% and about 10% of a lower aliphatic monocarboxylic acid.

7. A process for refining fish liver oils, which comprises contacting the oil with cottonseed meal in the presence of a solvent for said oil, said solvent containing between about 1% and about 10% of a lower aliphatic monocarboxylic acid.

8. A process for refining fish liver oils, which comprises mixing a solvent for said fish liver oil with a vegetable meal, said solvent containing a relatively small amount of a lower aliphatic monocarboxylic acid, adding to said mixture the fish liver oil to be refined, agitating the mass, removing the meal and recovering the refined fish liver oil.

9. A process for refining fish liver oils, which comprises mixing a solvent for said fish liver oil with a vegetable meal, said solvent containing a relatively small amount of acetic acid, adding to said mixture the fish liver oil to be refined, agitating the mass, removing the meal and recovering the refined fish liver oil.

10. A process for refining fish liver oils, which comprises mixing a solvent for said fish liver oil with soybean meal, said solvent containing a relatively small amount of acetic acid, adding to said mixture the fish liver oil to be refined, agitating the mass, removing the meal and recovering the refined fish liver oil.

11. A process for refining fish liver oils, which comprises mixing a solvent for said fish liver oil with wheat germ meal, said solvent containing a relatively small amount of acetic acid, adding to said mixture the fish liver oil to be refined, agitating the mass, removing the meal and recovering the refined fish liver oil.

12. A process for refining fish liver oils, which comprises mixing a solvent for said fish liver oil with cottonseed meal, said solvent containing a relatively small amount of acetic acid, adding to said mixture the fish liver oil to be refined, agitating the mass, removing the meal and recovering the refined fish liver oil.

LORAN O. BUXTON.